March 29, 1949.　　　R. C. FERRAR　　　2,465,364
OSCILLOGRAPH SYSTEM

Filed Sept. 14, 1945　　　2 Sheets-Sheet 1

INVENTOR
ROBERT C. FERRAR
BY
ATTORNEY

March 29, 1949.   R. C. FERRAR   2,465,364
OSCILLOGRAPH SYSTEM

Filed Sept. 14, 1945   2 Sheets-Sheet 2

INVENTOR
ROBERT C. FERRAR
BY
ATTORNEY

Patented Mar. 29, 1949

2,465,364

UNITED STATES PATENT OFFICE 2,465,364

OSCILLOGRAPH SYSTEM

Robert C. Ferrar, New Providence, N. J., assignor to Federal Telephone and Radio Corporation, New York, N. Y., a corporation of Delaware Application September 14, 1945, Serial No. 616,344

9 Claims. (Cl. 315—22)

This invention relates to an electrical apparatus and more particularly to an oscillograph system. The invention herein relates to that type of cathode ray tube wherein two sets of deflecting electrodes for horizontal and vertical deflection are utilized although it may be applied to the polar scan type of tube. The invention is applicable to either electrostatic or electro-magnetic deflection.

In most cathode ray tube systems, so-called vertical and horizontal deflecting electrodes are provided. Whether such electrodes are actually used for vertical or horizontal deflection is not important, since the tube may be turned or tilted. For convenience, however, the terms vertical and horizontal are used. Thus, the vertical control electrodes generally have impressed thereon the wave to be studied. The horizontal control electrodes generally have impressed thereon sweep potentials which effectively introduce time as one of the two coordinates in the presentation.

As is well known, the sweep circuits in cathode ray tube systems comprise sweep generators associated with a type of relaxation oscillator. The sweep generator includes usually a condenser or inductance across which charging and discharging potentials may be developed. One of these potentials may be used for generating the visible sweep while the other may be used for return. Thus, the relaxation oscillator associated with the sweep generator provides complete control over the beam as far as horizontal travel is concerned.

In the operation of a cathode ray tube system, it is difficult to provide the flexibility of sweep control that may be required. The average cathode ray tube system may have a sweep frequency ranging from a few cycles per second up to about 25,000 cycles per second. It frequently happens that sweep frequencies greatly in excess of this range would be desirable and are necessary. With high sweep frequencies, the return time becomes important. It is desirable, therefore, that the return time of the beam be reduced to a low value in comparison to the sweep time.

It is also desirable that the sweep circuits in a cathode ray tube system be insensitive to any triggers for a predetermined sweep time after initiation of a sweep cycle. This is not true of present-day cathode ray tube systems. In many instances, a strong trigger will act on the sweep generator, even after a sweep has started, resulting in confusion for some cycles.

A system embodying the invention herein provides a cathode ray tube system having a high degree of operational flexibility with a minimum of circuit complexity. By virtue of this invention, a cathode ray tube system may have sweeps of variable length and speed. A system embodying this invention separates sweep duration and trigger rate so that one is independent of the other. Other advantages will be apparent to one skilled in the art.

The invention will be described in detail in connection with the drawings wherein Figure 1 shows a block diagram of a cathode ray tube system embodying the present invention.

Figure 1:
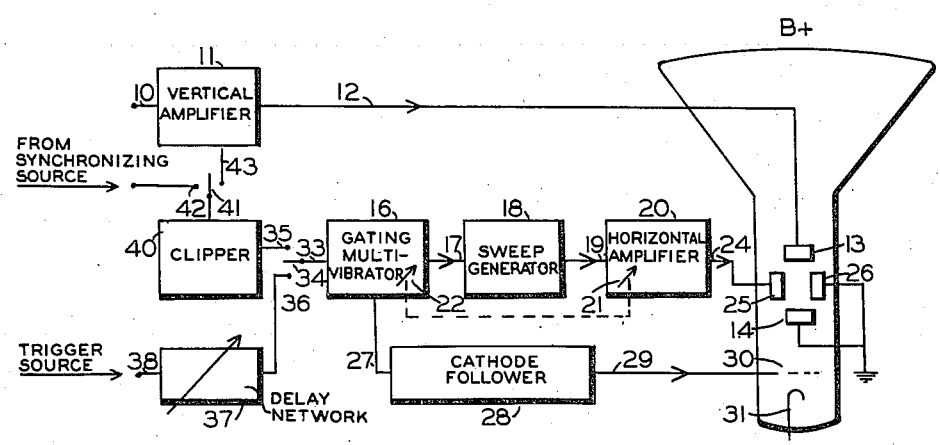

Referring now to Figure 1, a signal input channel 10 feeds a vertical or Y axis amplifier 11. This amplifier may be a conventional amplifier such as used in any of the cathode ray tubes now on the market. Amplifier 11 feeds its output to lead 12 going to vertical deflecting electrode 13 of a cathode ray tube. Electrode 13 may cooperate with grounded electrode 14 to control vertical deflections.

As shown, electrodes 13 and 14 are of the electrostatic type. It is understood, however, that magnetic deflecting coils may be used, in which case amplifier 11 will be a current amplifier rather than a voltage amplifier.

For convenience, electrode 14 is shown as grounded. In actual practice, push-pull operation on electrodes 13 and 14 is generally provided with electrodes 13 and 14 being oppositely charged with respect to ground. Thus, centering of the beam may be effectively accomplished.

For horizontal control, gating multi-vibrator 16 is provided. This multi-vibrator is of the so-called flip-flop type, biased to one condition and going through a single cycle upon triggering by a suitable impulse. Such flip-flop multi-vibrators are well known in the art, and an example of one is given in Figure 2. However, single tube multi-vibrators using pentodes are also well known, such as disclosed for example in Time Bases by Puckle published in 1943, page 45. Other types of flip-flop circuits are shown on pages 50 to 53 inclusive of this same book.

Since a convenient source of sharp pulses is desired, other means than a multi-vibrator may be used. Thus, a blocking oscillator may provide a pulse. Where the pulse duration is more than a micro-second or so, it is customary to have the oscillator operate at radio frequency and use the envelope.

Multi-vibrator 16 is connected by line 17 to sweep generator 18 to control the same. Sweep generator 18 may be any type desired, such as is disclosed in various portions of the reference book cited. For electrostatic control, a substantially saw-tooth sweep generator is required. In actual practice, sweep generator 18 may be of the push-pull type wherein opposing saw-teeth are generated simultaneously to be applied to the opposing deflecting electrodes. Thus, symmetrical electrode operation results, and the beam will be centered with no applied potential.

Sweep generator 18 feeds its output by channel 19 to an X axis amplifier 20. Amplifier 20 may be of the push-pull variety if sweep generator 18 is of that type. Amplifier 20 has a gain control indicated by arrow 21 which is tied mechanically to a control indicated by arrow 22 on multi-vibrator 16. The detailed operation of these two controls will become apparent in connection with the description of Figure 2.

Amplifier 20 is connected by line 24 to horizontal deflecting electrode 25. For simplicity, co-operating horizontal electrode 26 is shown as grounded. In the event, however, that sweep generator 18 and amplifier 20 are of the push-pull type, it will be understood that electrode 26 will be connected to the amplifier.

Multi-vibrator 16 is also connected through line 27 with some isolating amplifier such as cathode follower 28 and thence connected by line 29 to control grid 30 of the cathode ray tube. By virtue of this arrangement, intensification of the beam during sweep time may be accomplished with the beam being extinguished during return time. It is possible to impress the intensifier pulse on cathode 31 of the cathode ray tube if desired, in which case the pulse would be of negative polarity. It is understood that the cathode ray tube includes a suitable electron gun including focusing means. This has not been shown, since it is well known in the art. Cathode 31 is merely a symbolic source of electrons.

Multi-vibrator 16 has input supply wire 33 connected to switch 34 operating between contacts 35 and 36. Contact 36 is connected through delay network 37 to line 38 representing any source of trigger impulse. Delay means 37 may constitute any suitable means for obtaining variable delay ranging from zero micro-seconds up to any desired time. Thus, delay lines consisting of inductance and capacitance are well known in the art. In addition, the utilization of reflections in a line for obtaining delay is also well known. Switch contact 35 is connected to the output of clipper 40, which in its simplest form may consist merely of a diode rectifier biased to clip any predetermined portion of a wave.

Clipper 40 has its input connected to switch 41 cooperating with contact 42 or 43 respectively. Contact 42 may be fed by any synchronizing source such as a sine wave generator, while contact 43 may be fed from the Y axis amplifier 11 for internal synchronization. Thus, an all purpose cathode ray tube system is provided wherein the sweep circuit may be controlled either by external triggers, an external synchronizing source, or may be controlled from the source whose wave form is being observed.

Figure 3:
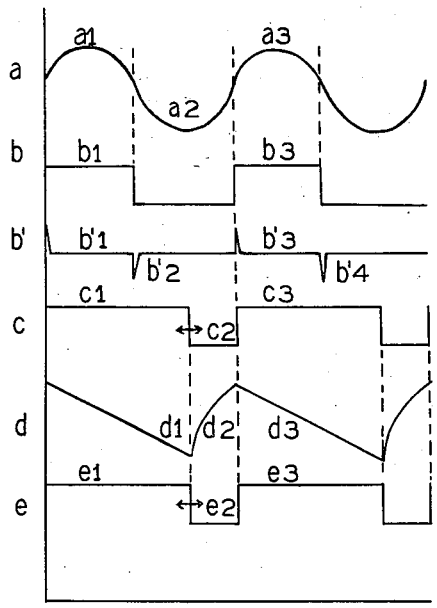
Figure 3 shows some voltage curves for the block diagram of Figure 1.

Referring to Figure 3, voltage curves illustrating the operation of the system of Figure 1 are shown. In accordance with usual practice, voltage is measured along the Y axis, and time is measured along the X axis. The position of the switches is such that switch 41 touches contact 43 and switch 34 touches contact 35. Thus, internal synchronization is provided.

Curve $a$ shows a signal input to be presented on a cathode ray tube. Thus, curve $a$ may have first positive peak $a1$ followed by negative peak $a2$, and thence by positive peak $a3$ and so on. It is not necessary that the signal have any fixed frequency or that the wave shape be sinusoidal. The signal represented by curve $a$ is fed by channel 10 to Y axis amplifier 11. A predetermined portion of this signal may be fed to clipper 40. Squaring and clipping circuits are well known, one example being given on page 465 of Television by Zworykin, 1940 edition.

Curve $b$ shows the output of clipper 40 after the positive peaks have been amplified, squared and clipped. Thus $b1$ is one positive peak corresponding in phase to peak $a1$ in curve $a$, and $b3$ is the succeeding positive peak corresponding to succeeding positive peak $a3$.

Curve $c$ shows the steep rectangular pulses generated by multi-vibrator 16. Since the pulses are shown as positive, curve $c$ may be assumed to be taken at anode 67 of Figure 2 to be described later. Obviously, the actual polarity of the peaks and pulses is of no great importance, as the polarity may easily be reversed. Curve $c$ consists of two positive peaks $c1$ and $c3$ separated by pulse $c2$, which represents the stable multi-vibrator condition. As shown, it happens that pulse $b3$ triggered the multi-vibrator and made $c2$ short. Otherwise $c2$ has no definite time duration.

It will be noted that the initial rise of pulse $c1$ is substantially coincident with the rise of $b1$. This assumes practically no phase displacement between the clipper and multi-vibrator. The duration of pulse $c1$ may be set to any desired time by choice of the multi-vibrator constants. Pulse $c1$ does not have a duration that is related to the duration of pulse $b1$. Once the multi-vibrator operation is initiated, it goes through its cycle independently of the output of clipper 40.

In the event that pulse $c1$ is shorter in time than pulse $b1$, it will be desirable to provide a differentiating circuit between clipper 40 and the multi-vibrator proper. In practice, the input to a multi-vibrator may be to the grid of a tube, and the input circuit itself will perform the differentiating action. The differential of curve $b$ is shown as curve $b'$. As a result of the differentiating action, sharp positive pips such as $b'1$ will suffice to trigger multi-vibrator 16. Thereafter, the multi-vibrator is completely independent of the input circuit during $c1$, negative peak $b'2$ having no effect.

As a result of the above action, pulse $c1$ may be as short as desired, while the remainder of the cycle shown as negative pulse $c2$ may be as long or short as desired depending upon triggers. Upon the occurrence of pulse $b3$, the positive pip at the beginning of the pulse will trigger the multi-vibrator to produce positive pulse $c3$.

Curve $d$ has portion $d1$ illustrating the generally linear sweep voltage for beam tracing. This beam trace is coextensive in time with multi-vibrator pulse $c1$. Voltage curve $d2$ represents the voltage change for beam retrace. This is coextensive with curve $c2$. $d3$ is the succeeding beam trace voltage curve and so on. The voltage shown in curve $d$ is that generated across electrodes 25 and 26 of the cathode ray tube. It is also the voltage generated at the output of sweep generator 18.

For controlling beam intensity, voltage curve $e$ taken at control grid 30 may be provided. Curve $e$ is substantially the same as curve $c$ having a positive pulse $e1$, negative pulse $e2$, and succeeding positive pulse $e3$ and so on. The negative pulses in this instance represent suppression of the electron beam, this occurring during the time of beam return indicated by curves $d2$ and $d4$.

Referring back to curve $d$, $d1$ represents the trace of the beam, while $d2$ is the retrace. Normally, at repetition frequencies below about 10,000 per second, the ratio of trace time duration to retrace time duration is of no great importance so long as sufficient time for retrace is provided. Thus, as a rule, the ratio of trace to retrace time may be of the order of ten or more. However, at frequencies above 10,000 cycles per second, the ratio of trace to retrace time may have to be reduced from the value given above. Assuming a full sweep across a screen, a retrace time of the order of about ten micro-seconds at least will be required. Assuming a ratio of trace to retrace of five to one, it follows, therefore, that a trace will require fifty micro-seconds for a full sweep. Thus a complete cycle will require fifty-five micro-seconds and impose a ceiling of about 20,000 cycles per second.

It is possible, however, to greatly exceed this ceiling frequency by cutting down the amplitude of the sweep. Thus, by virtue of the invention herein, it is possible to cut the amplitude of the sweep down as much as ninety per cent of the full sweep and, at the same time, raise the ceiling frequency to around 200,000 cycles per second. It is still possible to maintain a trace to retrace ratio of the order of five to one. It is clear that a cathode ray tube system embodying the present invention and having a sweep frequency of the order of 200,000 cycles per second can only utilize vacuum tubes in the sweep circuits and cannot rely upon gas tube types of relaxation oscillators.

Figure 2:
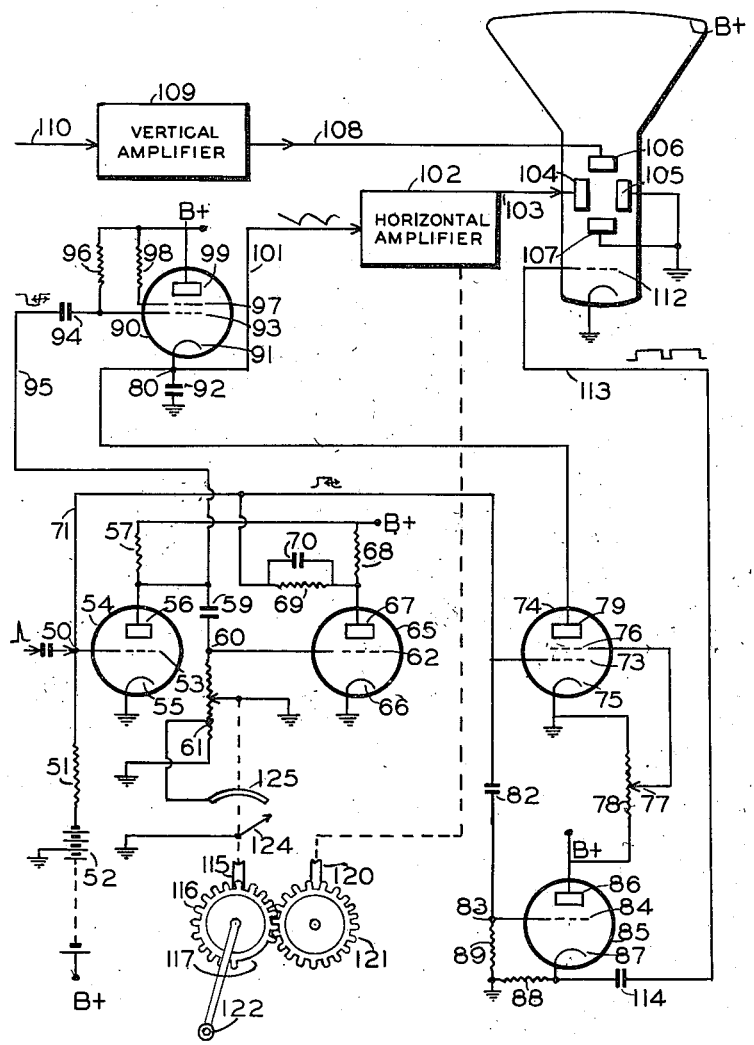
Figure 2 is a circuit diagram of a cathode ray tube system according to the block diagram of Figure 1 when the system is connected for external triggers.

In Figure 2, a circuit diagram is shown of that portion of the block diagram beginning with the multi-vibrator and extending onward in the direction of feed toward the cathode ray tube. Thus, specifically referring to Figure 2, junction 50 together with ground constitutes an input channel to which synchronizing impulses from any source whatsoever may be fed. The input channel may have a blocking condenser as shown. Junction 50 is connected through grid resistor 51 to negative terminal of high voltage power supply 52.

The blocking condenser and grid resistor may provide a differentiating action by having the time constant small compared to the trigger repetition rate. The power supply is symbolically shown as a battery although, in practice, it would be rectified and filtered alternating current. A point somewhat positive is taken as ground. Junction 50 is connected to control grid 53 of vacuum tube 54 forming part of the multi-vibrator. Tube 54 has cathode 55 grounded, while anode 56 is connected through load resistor 57 to B plus. B plus is the positive terminal of high potential source 52, and the connections are not completed merely for convenience.

Anode 56 is also connected through blocking condenser 59 to junction 60, which junction is connected to ground through variable grid resistor 61. Junction 60 is connected to control grid 62 of vacuum tube 65 which is the companion tube to 54 to form a multi-vibrator. Tube 65 has cathode 66 grounded, while anode 67 is connected through load resistor 68 to B plus. Anode 67 is also connected through resistance 69 shunted by condenser 70 to lead 71 going to junction 50.

Tubes 54 and 65 as shown constitute a biased multi-vibrator of the flip-flop type. It is understood that other types of multi-vibrators may be used. Thus, a simple change in connections would convert the multi-vibrator shown from the grid-feed type to the cathode-feed type. As shown, the multi-vibrator normally has tube 54 cut off and tube 65 conducting.

Lead 71 going from junction 50 provides a connection to control grid 73 of sweep generator tube 74. Tube 74 is shown as of the tetrode type, but may be replaced by any other vacuum tube of three or more electrodes. As is well known, a tetrode and better still a pentode have more desirable characteristics for sweep generation due to constant current. Tube 74 has cathode 75 grounded and has accelerating anode 76 connected to potentiometer wiper 77 operating on resistor 78 connected between B plus and ground. Thus, accelerating electrode 76 may be given any desired bias.

Tube 74 has anode 79 connected to junction 80, this junction being in the cathode circuit of a charging tube. Lead 71 continues on to blocking condenser 82. Condenser 82 is connected to junction 83, from which point a connection is made to control grid 84 of cathode follower 85. Cathode follower 85 has anode 86 connected directly to B plus, while cathode 87 is connected to ground through load resistor 88. Grid resistor 89 is connected between junction 83 and ground. Cathode follower 85 is adapted to supply beam intensifier pulses to the cathode ray tube. It is therefore desirable to avoid differentiating action on grid 84.

Charging tube 90 has cathode 91 connected to junction 80 which, in turn, is connected to grounded condenser 92 across which sweep voltages are generated. Charging tube 90 has a control grid 93 connected through blocking condenser 94 and lead 95 back to anode 56 of the multi-vibrator. Control grid 93 is also connected through resistance 96 to B plus. Charging tube 90 has accelerating anode 97 connected through suitable dropping resistor 98 to B plus. This tube also has anode 99 connected to B plus. Tube 90, as shown, is of the four element type and may be replaced by any other desired type of tube.

From junction 80, lead 101 is provided going to horizontal gain amplifier 102. Thus, the sawtooth developed across condenser 92 may be supplied to amplifier 102. Amplifier 102 may be of any type desired and feeds its output to lead 103 going to electrode 104, this being one of the two horizontal control electrodes. Cooperating electrode 105 may be grounded.

As pointed out in connection with the block diagram, in practice, the output of the sweep generator taken at junction 80 will be fed to a push-pull amplifier. Push-pull saw tooth generators are well known, the reversed saw-teeth having the form shown in Figure 73A on page 112 of Time Bases by Puckle previously mentioned. Thus, the sweep generator shown in the circuit here may feed a push-pull amplifier, such as shown in Figure 76 on page 117 of this book, so that deflection electrodes 104 and 105 will be operated in push-pull.

Deflection electrodes 104 and 105 of the cathode ray tube are shown as of the electrostatic type.

However, electromagnetic deflecting coils may be used and are within the scope of the invention herein. In such case, the sweep circuits will be the ones used with electromagnetic deflection.

The cathode ray tube has vertical deflecting electrodes 106 and 107, the latter being shown as grounded. Vertical deflecting electrode 106 is connected by lead 108 to vertical gain amplifier 109 having input 110. Vertical gain amplifier 109 may be a conventional amplifier of any type desired, such as is used in cathode ray tubes on the market or in any other system.

The cathode ray tube has control grid 112 connected by lead 113 through blocking condenser 114 to cathode 87 of cathode follower 85.

The operation of the system is as follows. Normally, vacuum tube 54 of the multi-vibrator is cut off, while tube 65 is conducting. Assume that a positive synchronizing pulse is fed into junction 50. This will result in a positive voltage pip on grid 53. Tube 54 will then become conducting. The potential at anode 56 begins to drop, this drop being communicated through blocking condenser 59 to control grid 62 and functioning to cut down space current through tube 65. The potential at anode 67 rises, this rise being communicated through condenser 70 to junction 50 and grid 53. Thus, the usual multi-vibrator action occurs with vacuum tube 54 going from cut-off to a highly conducting condition, and vacuum tube 65 going from a highly conducting condition to cut-off. By proper design of the multi-vibrator, the change in tube condition may occur within an exceedingly short time of the order of a small fraction of a micro-second.

As is well known in multi-vibrators, the initial pulse triggers the multi-vibrator off so that it is no longer sensitive to any normal trigger pulses. With tube 54 conducting and tube 65 cut off, conditions become stabilized for a short period of time corresponding to pulse $c_1$ of Figure 3. Condenser 59 begins to discharge and condenser 70 begins to charge and, after a period of time determined by the time constants of these condensers, the multi-vibrator starts on its reverse part of the cycle. Tube 65 begins to conduct and tube 54 begins to go toward cut-off.

It is evident that, at junction 50 and in lead 71, a positive pulse will be generated during the first part of a cycle of operation of the multi-vibrator. This positive pulse originating at anode 67 will be impressed upon control grid 73 to sweep generator tube 74. Tube 74 is normally biased to cut-off, as by having control grid 73 at the same potential as junction 50. The positive pulse impressed upon line 71 drives grid 73 positive and renders tube 74 conducting. This serves to discharge sweep generating condenser 92 and reduce its potential to a value determined by the duration of positive pulse $c_1$ and the space charge passing through tube 74. The constant current conduction characteristic of tube 74 makes for a straight discharge curve $d_1$ over a long discharge time. Other linearizing means may be used.

The positive pulse at line 71 is also impressed through blocking condenser 82 upon control grid 84 of cathode follower 85. Cathode follower 85 is normally biased at or just above cut-off. However, the appearance of a steep positive pulse upon control grid 84 renders the tube conducting. The space current going to cathode 87 and thence through load resistor 88 causes the potential of cathode 87 to jump. Pulse $e_1$ generated at the cathode is communicated through blocking condenser 114 to control grid 112. By virtue of the bias of the various electrodes in the cathode ray tube, control grid 112 which may normally suppress the electron beam is raised in potential to permit the electron beam to pass. If desired, the beam may normally be at a low level and merely be increased in intensity.

During the operation of the multi-vibrator, a negative pulse from anode 56 is impressed upon line 95 and passes through blocking condenser 94 to control grid 93 of charging tube 90. Charging tube 90 normally is biased so that it conducts and permits condenser 92 to charge. However, the arrival of a steep negative pulse on control grid 93 cuts off charging tube 90 during the existence of this pulse.

The positive and negative pulses on lines 71 and 95 respectively occur simultaneously. Thus, when charging tube 90 is cut off, tube 74 is cut in to discharge condenser 92. After the negative pulse on line 95 has passed, charging tube 90 is cut in, and condenser 92 begins to charge. The charging of condenser 92 results in the potential of junction 80 going up. It is desirable to have a steep charging curve $d_2$ so that retrace time may be reduced to a minimum. This, of course, occurs during $c_2$.

It is evident that the intensity of the synchronizing signal coming into junction 50 has substantially no effect upon the speed of operation of the multi-vibrator. Assuming that the pulse is sufficient to trigger the multi-vibrator, the multi-vibrator goes through its cycle and, during the cycle, is insensitive to further trigger pulses. Each portion of the multi-vibrator cycle may be independently adjusted by controlling the time constant of the respective grid circuits. This is most conveniently accomplished by varying the resistance in the circuit in question, although varying the condenser may also be relied upon. Thus, resistor 61 is made variable and, if desired, resistor 69 may also be made variable. Condenser 59 and resistor 61 control the duration of that portion of the cycle generating the positive pulse on line 71 and the negative pulse on line 95. Thus, varying resistor 61 (or condenser 59) will vary the duration of the sweep or the length of $d_1$ along the time axis. The slope of $d_1$ will not be changed so that the beam amplitude will also be varied. To vary the slope of $d_1$, it is necessary to vary wiper 77. Thus, the discharge rate of condenser 92 will be changed. This is generally undesired as linearity of sweep may be affected. The same effect may be obtained by controlling horizontal gain.

When resistor 61 is turned down to provide less resistance, the duration of $c_1$ (Figure 3) is reduced. This will only affect the lower end of $d_1$. The high end of $d_1$ (the potential across condenser 92) is purely a function of $c_2$ with a maximum value. This will not affect the centering of the horizontal beam path on the cathode tube screen, since the sweeps are passed through blocking condensers. Thus, a beam initially centered will remain centered irrespective of change in resistor 61. By turning up horizontal gain, the beam amplitude may be increased to compensate for the action due to reducing resistor 61. By proper mechanical means, the two controls may be tied together to maintain a constant beam amplitude in spite of variation in beam duration.

Beyond a certain point, when the ratio of beam trace time to beam retrace time drops to about five, it will be undesirable to provide the compensating action due to increased horizontal gain. In such case, a lost motion connection may be provided. Thus, further reduction of resistance 61 will not cause an increase in horizontal gain. Then the beam amplitude will be reduced.

A simple means for effecting this is shown in Figure 2. Resistor 61 is controlled by shaft 115 carrying gear 116 having part 117 undercut. The horizontal gain control is on shaft 120 carrying gear 121 meshing with mutilated gear 116. Knob 122 operates shaft 115. Obviously, when gear 116 is turned, gear 121 will turn so long as the gears mesh. Undercut part 117 will permit beam duration to be cut independently of gear 121. So beam amplitude will decrease also.

In all cases where the beam duration is varied, it is obvious that the number of cycles shown on the screen will be varied. Thus, if the beam duration is increased, more cycles or a greater part of a cycle will appear. Conversely, on reducing beam duration, the number of cycles (if more than one is shown) will be reduced.

By proper timing of trigger pulses to the multi-vibrator, any desired part of a high frequency cyclic wave may be shown.

No precise setting for knob 122 is necessary. Thus, within what might be termed the low frequency range of operation, when gears 116 and 121 mesh, the system will accommodate itself to any trigger frequency up to a maximum in the low frequency range. This range might be from zero to say 10,000 cycles per second. Within this range, any precise adjustment of knob 122 would be for the purpose of selecting the portion of wave desired or the number of complete waves to be presented on the screen in one sweep cycle.

For high frequency operation above 10,000 cycles per second, knob 122 may be moved to any portion of the range where the two gears no longer mesh. In such case, any precise adjustment of knob 122 would also be for the purpose of controlling the presentation. It is, thus, possible to provide knob 122 with two settings. The low frequency setting may provide for one value of resistance 61, while the other setting for high frequency operation would provide another value for resistance 61. In other words, resistance 61 may be two fixed resistors. Thus, a high value of resistance of the order of about 500,000 ohms may be used over the entire range of knob control where the gears mesh and suffice for low frequency control. Any adjustment of knob 122 within the low frequency range would merely be for the purpose of controlling horizontal gain. Thus, shaft 115 may be grounded and carry movable contact 124. An arcuate fixed contact 125 is connected to a suitable point or resistance 61. Fixed contact 125 may be engaged by movable contact 124 only when gears 116 and 121 do not mesh and thus short out as much of 61 as desired.

Thus, a low value of resistance of the order of about 2500 ohms may be switched in by knob 122 in the high frequency setting when the gears do not mesh. Such low value resistance will permit the multi-vibrator to recover faster and thus be triggered at a faster rate. Since a multi-vibrator is quite flexible with regard to trigger repetition frequency, the use of two resistances in the above fashion will suffice to cover the entire frequency range of operation of the multi-vibrator.

In the event that a blocking oscillator is used instead of a multi-vibrator for pulse generation, a continuously variable resistance, as shown in 61, will generally be necessary. Blocking oscillators as a rule do not have the flexibility of a multi-vibrator with regard to variation of trigger frequency.

It is evident that in a cathode ray tube system embodying the invention herein that independence between sweep duration and trigger repetition rate results. Whatever setting is used for knob 122, the system can operate over the entire frequency range from zero to the highest frequency without loss of synchronization. The only objective of knob adjustment and resistance variation is merely to correlate sweep duration and amplitude so that for low frequencies full scale operation is assured.

It is evident that the invention may also be applied to polar scan types of cathode ray tubes. In such tubes, the beam sweeps delineate radius vectors. The same problems of beam trace and retrace are present as in the conventional type of tube. In polar scan tubes, the beam intensity is controlled for signal indication. Hence, curve e of Figure 2 would have superimposed thereon signal intensifier pulses.

What is claimed is:

1. In a cathode ray tube system having a condenser across which potential variations are developed for generating sweeps, means including a vacuum tube connected across said condenser, said vacuum tube normally cut off and being adapted to discharge said condenser when cut in to provide a beam trace, a second vacuum tube and source of potential connected in series with said condenser, said second tube being normally conducting to charge said condenser and provide a beam retrace, a biased multi-vibrator for providing a pulse having a predetermined duration, means for applying a pulse to said two vacuum tubes to render said first and second tubes conducting and non-conducting respectively only for the duration of said pulse, and means for energizing said multi-vibrator through one cycle in response to a suitable signal.

2. The system of claim 1 wherein variable means are provided for changing the operation of said multi-vibrator to vary said pulse duration.

3. In a cathode ray tube system having a reactance element across which potential variations are developed for generating sweeps, an amplifier fed by said reactance element, means normally inoperative cooperating with said reactance element for varying the potential across the same in one sense corresponding to beam trace, means normally operative cooperating with said reactance element for varying the potential across the same in a reverse sense corresponding to beam retrace and thereafter maintaining said potential at a fixed value corresponding to a beam resting position at the start of a trace, signal responsive means comprising a biased multi-vibrator for generating a pulse, means for applying said pulse to both cooperating means to render said first and second named means operative and inoperative respectively only for the duration of said pulse, and means for varying the pulse duration and amplifier gain simultaneously to maintain the beam amplitude substantially constant over a wide range of frequencies.

4. A cathode ray tube system having a wide frequency band response, said system having a condenser across which potential variations are developed for generating sweeps, an amplifier for controlling the sweep amplitude, means normally inoperative cooperating with said condenser for varying the potential across the same in one sense corresponding to beam trace, means normally operative cooperating with said condenser for varying the potential across the same in a reverse sense corresponding to beam retrace and thereafter maintaining said potential at a fixed value corresponding to a beam resting position at the start of a trace, signal responsive means comprising a biased multivibrator for generating a pulse, means for applying said pulse to both cooperating means to render said first and second named means operative and inoperative respectively only for the duration of said pulse, means for varying said pulse duration, and means for varying the gain of said amplifier whereby said beam amplitude may be varied up to a maximum over a predetermined low frequency range of cathode ray tube operation and may be reduced with increasing frequency above said low frequency range to maintain a proper ratio of beam trace to retrace time.

5. The system of claim 4 wherein said two named means cooperating with said reactance element comprise two vacuum tubes, the first named means providing a normally cut off tube condition and the second named means providing a normally cut in tube condition.

6. A cathode ray tube system having a wide frequency band response, said system having a condenser across which potential variations are developed for generating sweeps, an amplifier for controlling the sweep amplitude, means normally inoperative cooperating with said condenser for varying the potential across the same in one sense corresponding to beam trace, means normally operative cooperating with said condenser for varying the potential across the same in a reverse sense corresponding to beam retrace and thereafter maintaining said potential at a fixed value corresponding to a beam resting position at the start of a trace, signal responsive means for generating a pulse, means for applying said pulse to both cooperating means to render said first and second named means operative and inoperative respectively only for the duration of said pulse, means for varying said pulse duration, and means for varying the gain of said amplifier whereby said beam amplitude may be varied up to a maximum over a predetermined low frequency range of cathode ray tube operation and may be reduced with increasing frequency above said low frequency range to maintain a proper ratio of beam trace to retrace time, said pulse generating means further comprising a multivibrator and said means for varying the pulse duration further including a resistance in said multivibrator and switching means for cutting out a portion of said resistance beyond said predetermined low frequency range.

7. A cathode ray tube system having a wide frequency band response, said system having a condenser across which potential variations are developed for generating sweeps, an amplifier for controlling the sweep amplitude, means normally inoperative cooperating with said condenser for varying the potential across the same in one sense corresponding to beam trace, means normally operative cooperating with said condenser for varying the potential across the same in a reverse sense corresponding to beam retrace and thereafter maintaining said potential at a fixed value corresponding to a beam resting position at the start of a trace, signal responsive means for generating a pulse, means for applying said pulse to both cooperating means to render said first and second named means operative and inoperative respectively only for the duration of said pulse, means for varying said pulse duration, and means for varying the gain of said amplifier whereby said beam amplitude may be varied up to a maximum over a predetermined low frequency range of cathode ray tube operation and may be reduced with increasing frequency above said low frequency range to maintain a proper ratio of beam trace to retrace time, said means for varying the pulse duration and means for varying the amplifier gain being interlocked over the low frequency range and independent beyond that range.

8. A cathode ray tube system in accordance with claim 1 further comprising a cathode ray tube having horizontal and vertical deflecting electrodes, an amplifier for one set of electrodes, a clipper, means for feeding the output of said clipper to said multivibrator, a sweep generator controlled by said multivibrator, an amplifier fed by said sweep generator and connections for applying the output of said last-named amplifier to the deflecting electrodes.

9. In a cathode ray tube system having a grounded condenser across which potential variations are developed for generating sweeps, a normally cut-off vacuum tube shunted across said condenser, said tube having cathode, anode and two control grids, said tube being adapted to cut-off or cut-in by control of said grid potential and when cut-in being adapted to discharge said condenser and generate a beam trace, a second vacuum tube, normally conducting and having cathode, anode and two grids, said second tube being adapted to be controlled by the potential on said grid, a connection between the cathode of said second tube and the high side of said grounded condenser, a source of direct current connected between ground and the anode of said second tube so that, when said second tube conducts, said grounded condenser becomes charged to provide a beam retrace, a signal responsive biased multivibrator, and connections from said multivibrator to said two tubes to cut-in said first tube and cut-off said second tube during the operation of said multivibrator.

ROBERT C. FERRAR.

REFERENCES CITED

The following references are of record in the file of this patent:

UNITED STATES PATENTS

| Number | Name | Date |
| --- | --- | --- |
| 1,934,322 | Osbon | Nov. 7, 1933 |
| 2,244,513 | Burton | June 3, 1941 |
| 2,350,069 | Schrader et al. | May 30, 1944 |
| 2,375,709 | Thompson | May 8, 1945 |
| 2,386,728 | Theisen | Oct. 9, 1945 |
| 2,410,920 | Atwood, Jr. | Nov. 12, 1946 |